United States Patent [19]

May

[11] 3,937,084

[45] Feb. 10, 1976

[54] LIQUID LEVEL INDICATOR

[75] Inventor: Walter M. May, Bethlehem, Pa.

[73] Assignee: Mack Trucks, Inc., Allentown, Pa.

[22] Filed: Apr. 26, 1974

[21] Appl. No.: 464,679

[52] U.S. Cl. .................... 73/309; 73/316; 137/558
[51] Int. Cl.² ........................................ G01F 23/06
[58] Field of Search ...... 73/309, 316; 137/551, 557, 137/558; 141/95

[56] References Cited
UNITED STATES PATENTS

| | | | |
|---|---|---|---|
| 1,691,730 | 11/1928 | Muzzy | 73/316 |
| 2,592,569 | 4/1952 | Henderson | 73/316 UX |

*Primary Examiner*—Richard E. Aegerter
*Assistant Examiner*—Frederick R. Schmidt
*Attorney, Agent, or Firm*—Brumbaugh, Graves, Donohue & Raymond

[57] ABSTRACT

A liquid level indicator for a liquid container, such as the crankcase oil reservoir of an internal combustion engine, comprises a source of fluid at a predetermined pressure and a fluid conduit system connected to the fluid source. A gage responsive to fluid pressure and a valve mechanism are coupled to the conduit system downstream of a restriction orifice in the system. The valve mechanism includes an outlet orifice for fluid in the system and a valve body that is movable axially of the orifice so as to vary its cross-sectional flow area. The valve body is coupled to a float that is mounted for limited vertical movement in the container so that when the liquid in the container is at any particular level within a predetermined range, the liquid exerts a buoyancy force on the float which is balanced by opposing forces, including the float weight and a force exerted by the pressurized fluid on the float through the valve body. The force exerted by the fluid is reflected in a corresponding fluid pressure in the conduit system between the restriction orifice and the outlet orifice. This pressure is a measure of the liquid level in the container.

6 Claims, 3 Drawing Figures

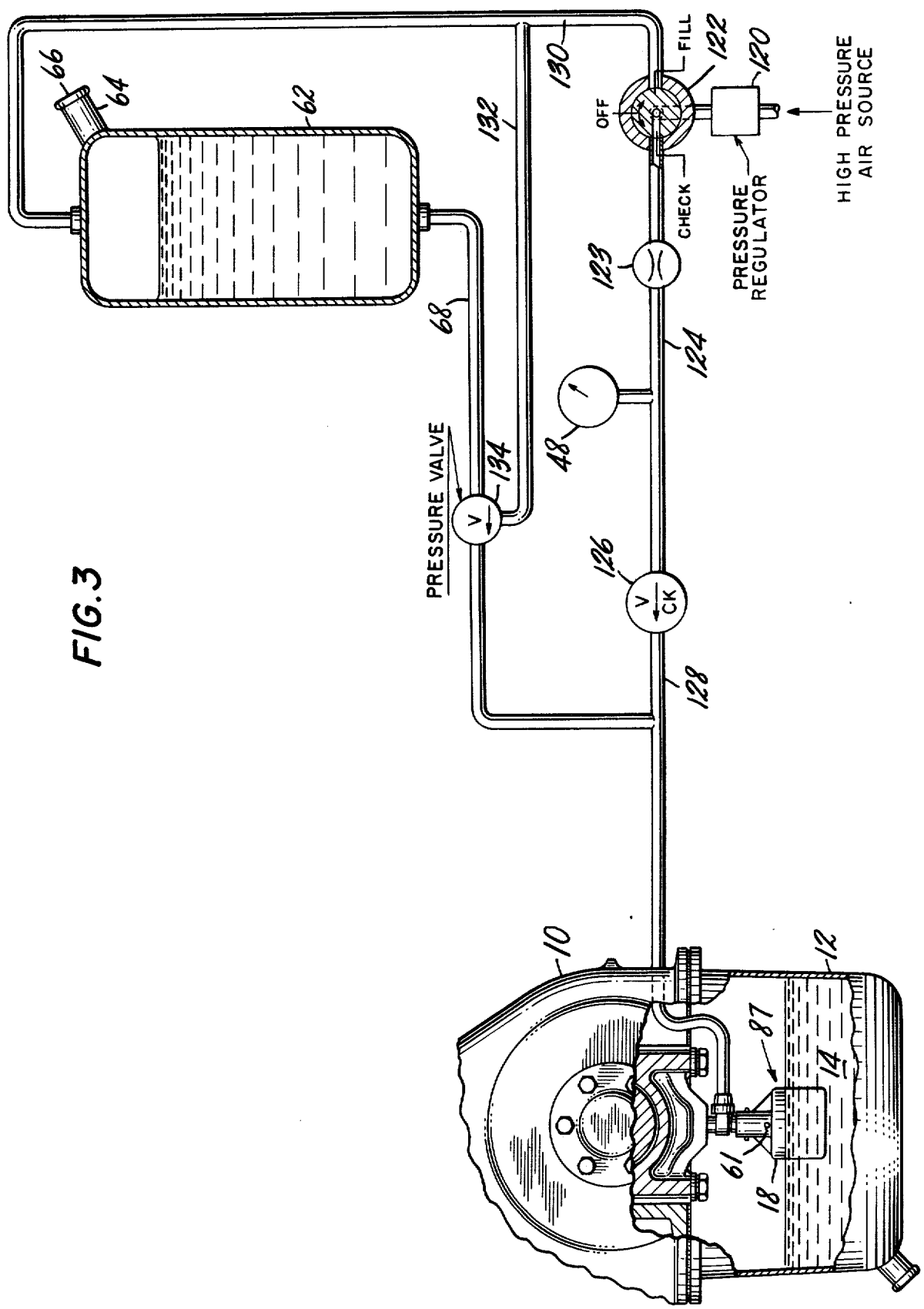

LIQUID LEVEL INDICATOR

BACKGROUND OF THE INVENTION

Adequate lubrication of the operating components of a reciprocating piston internal combustion engine is essential since relative motion between unlubricated contacting surfaces will cause excessive wear, overheating, and seizure of the components. The energy loss associated with engine wear and overheating will also result in reduced engine power and efficiency.

A typical reciprocating piston internal combustion engine is equipped with a crankcase oil pan or reservoir for storing the lubricant necessary for normal engine lubrication. An oil pump transports the lubricant to the operating components of the engine. In order to provide sufficient oil pressure at the operating components for adequate lubrication, the oil pump inlet is generally submerged in the reservoir below the surface of the oil, which must be maintained above some minimum level in order to provide sufficient head over the pump inlet and to enable any necessary splash lubrication.

At present, a dipstick is commonly used to determine the level of oil in the crankcase reservoir. The oil level is read by removing the dipstick from the reservoir and comparing the location of the residual oil on the dipstick to lines scribed thereon. The use of a dipstick is inconvenient in a motor vehicle, since the operator must stop the vehicle, and preferably the engine, and dismount to read the dipstick. Nonetheless, dashboard indicators for the level of oil in a motor vehicle oil reservoir are not used. Instead, motor vehicles are equipped with indicators that measure the oil pressure delivered by the oil pump, which is only indicative of inadequate oil in the oil reservoir when there is no longer sufficient oil in the reservoir to keep the pump adequately supplied.

SUMMARY OF THE INVENTION

The present invention is directed to a liquid level indicator for a liquid container, such as the crankcase oil reservoir for a reciprocating piston internal combustion engine. The indicator comprises a source of fluid at a predetermined pressure and a conduit system for the fluid which is coupled to and communicates with the fluid source. A gage responsive to fluid pressure and a valve mechanism are coupled to the conduit system downstream of a restriction orifice in the system. The valve mechanism includes an orifice that communicates with the conduit system and is the outlet for fluid in the system. The effective cross-sectional flow area of the outlet orifice can be varied by a valve body that is movable axially of the orifice. The valve body is coupled to a float that is mounted for limited vertical movement in the container so that when the liquid in the container is at any particular level within a predetermined range, the liquid exerts a buoyancy force on the float which is balanced by opposing forces that include the weight of the float and a force exerted by the pressurized fluid on the float through the valve body. The force exerted by the fluid is reflected in a corresponding fluid pressure in the conduit system between the restriction orifice and the outlet orifice. This fluid pressure is registered on the pressure gage and is a measure of the liquid level in the container.

In a preferred embodiment, the entire valve mechanism is located within the liquid container and a control is provided for selectively interrupting the flow of pressurized fluid from the fluid source to the valve mechanism and the gage. The gage is located remote from the float and the liquid container, and indicates the fluid pressure in the conduit system in terms of the liquid level in the container.

As can be seen from the above description, the present invention is particularly suited for use with the reciprocating piston engine of a motor vehicle, whereby the oil level in the crankcase oil reservoir can be displayed on a gage mounted on the vehicle dashboard. More particularly, the invention is suited for use in a heavy duty vehicle that is equipped with pneumatic brakes, for example, and associated apparatus for compressing air and delivering a supply of pressurized air to various systems of the vehicle. Such an existing source of pressurized air can be readily tapped for operating the indicator of the present invention without requiring additional air compressing equipment. Alternatively, pressurized oil could be used in the fluid conduit system, the oil being obtained from the engine oil lubrication system, for example.

The present invention provides an effective, accurate liquid level indicator with a minimum number of components. The compact and uncomplicated construction is achieved by the direct application of pressurized fluid, such as air, on a valve body coupled to a float to balance the buoyancy force exerted on the float by the liquid in a container. The invention is to be distinguished from apparatus, such as shown in the Slough U.S. Pat. No. 1,861,886, which operates on the vacuum produced by an engine manifold and which includes numerous chambers at sub-atmospheric pressures and at least one expandable bellows element. Similarly, the invention is to be distinguished from complicated null-finding and force measuring systems, such as shown in the Breedlove U.S. Pat. No. 2,599,159 and the Coleman U.S. Pat. No. 2,416,570, which utilize compressed air to balance the force applied on a float by a liquid in which the float is immersed.

BRIEF DESCRIPTION OF THE DRAWINGS

For a better understanding of the invention, reference may be made to the following description of an exemplary embodiment, taken in conjunction with the figures of the accompanying drawings, in which:

FIG. 3 is a partial sectional view of a second automatic oil refill system for the crankcase oil reservoir of a reciprocating piston engine, which system also incorporates the liquid level indicator of the present invention.

DESCRIPTION OF PREFERRED EMBODIMENTS

Figure 1:
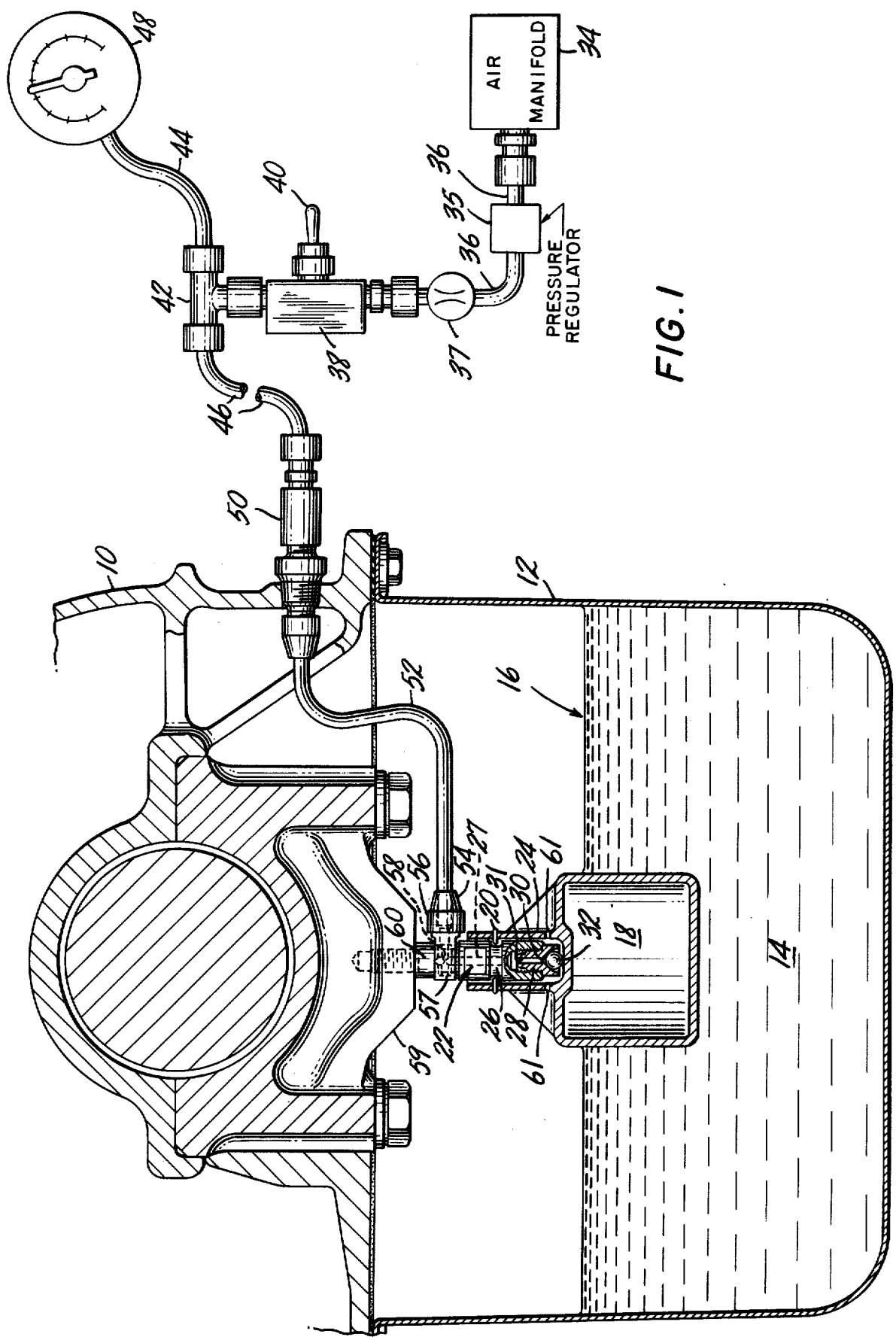
FIG. 1 is a partial sectional view of a crankcase oil reservoir for a reciprocating piston engine equipped with a liquid level indicator according to the present invention.

FIG. 1 of the drawings illustrates the lower portion of the crankcase 10 of a reciprocating piston engine in a motor vehicle and an associated oil pan or reservoir 12 attached to the bottom of the crankcase. The oil pan 12 contains a lubricant 14, such as lubricating oil, which fills the pan to a desired predetermined level 16. A conventional oil pump (not shown) pumps oil from the reservoir 12 and circulates the oil under pressure to the operating components of the engine.

Within the oil pan 12 is a float 18 which is coupled by a metal clip 20 to a downwardly projecting tubular fitting 22. As illustrated, the float has a tubular projection 24 extending from the top surface thereof which slides over the end of the fitting 22. The clip 20 extends through the tubular projection 24 at two diametrically opposed locations and has lugs that extend radially inwardly of the projection 24 into an annular groove 26 in the outer surface of the fitting 22. The axial width of the annular groove 26 is greater than the thickness of the clip lugs so that the clip 20 and thus the float 18 to which the clip is secured can move vertically for a limited distance along the length of the fitting 22. Engagement between the lugs of the clip 20 and the lower edge of the groove 26 retains the float 18 on the fitting 22 when the oil 14 is drained from the reservoir 12, for example.

The fitting 22 has a central passageway 27 that is outwardly flared at its lower end. The interior surface of the fitting 22 defining the flared end of the passageway 27 is threaded and threadedly receives a tubular valve seat 28. An outlet orifice 30 in the valve seat 28 communicates with the passageway 27 in the fitting 22 through a passageway 31 in the valve seat. A valve body 32, in the form of a ball, is received in the orifice 30 and is supported by the upper surface of the float 18 forming the closed end of the tubular projection 24. Thus, the axial position of the float 18 relative to the valve seat 28 determines the relative spacing between the sealing surfaces of the valve body 32 and the valve seat 28, and therefore determines the effective crossectional flow area of the orifice 30.

Pressurized air is delivered to the fitting 22 from an air manifold 34 which is supplied by an air compressor (not shown) associated with and powered by the engine. In heavy duty motor vehicles, the compressor may also supply compressed air for operating other pneumatic systems, such as air brakes. In order to achieve a predetermined constant pressure, a conventional air pressure regulator 35 is included in the supply line or conduit 36 from the air manifold 34. Downstream of the regulator 35 is a conventional restriction orifice 37 having a fixed cross-sectional flow area and, following the orifice, a control valve 38 of conventional design, which is preferably mounted on the dashboard in the vehicle cab. The control valve 38 is used to interrupt the flow of pressurized air to the remainder of the air conduit system, described hereinafter, so that the indicator of the invention is actuated only when the vehicle operator so desires. The control valve 38 is manipulated by a toggle switch 40.

When the control valve 38 is open, air under pressure is delivered through a T fitting 42 to pneumatic lines 44 and 46. The line 44 extends to a gage 48 that is preferably mounted in the vehicle cab and is responsive to pressure in the connected system of air conduits, including the lines 44 and 46. The face of the gage 48 is calibrated to indicate the number of quarts of oil in the reservoir 12, however, rather than the air pressure in the conduit 44, inasmuch as the volume of oil in the reservoir is related to the air pressure in the line 44, as will be described.

The air line 46 is connected to a fitting 50 that is mounted on and extends through the side of the crankcase 10 and is connected on the inside of the crankcase 10 to one end of an air line 52. The other end of the air line 52 is connected by a sleeve 54 and a nut 56 to a connector fitting 57 that in turn is connected to the upper end of the tubular fitting 22, the fitting 57 communicating the line 52 with a radial passage 58 in the fitting 22, the radial passage communicating with the axial passageway 27. The upper end of the fitting 22 is threaded and screws into a main bearing cap 59. A spacer 60 locates the connector 57 (and therefore the nut 56) in spaced relation to the adjacent surface of the bearing cap 59. The system of air lines 46 and 52 and fittings 42, 50, 54, 57 and 22 thus provides a continuous conduit for pressurized air from the control valve 38 to the outlet orifice 30 in the valve seat 28. A plurality of lateral bores 61 through the wall of the tubular projection 24 permits the pressurized air escaping through the outlet orifice 30 to be vented to the space above the oil 14.

In operation, when the oil 14 in the oil reservoir 12 is at any particular level within the operating range of the indicator and the control valve 38 is opened, the float 18 is at least partly immersed in the oil, which exerts a buoyancy force on the float 18. Opposing the buoyancy force are the weight of the float 18, the weight of the valve body 32, and the force exerted by the pressurized air on the valve body and, thus, on the supporting float. The force exerted by the pressurized air is related to the pressure in the air conduit system, which, in turn, is related to the constant pressure at which air is being delivered from the pressure regulator 35, the cross-sectional flow area of the restriction orifice 37 and the effective cross-sectional flow area of the orifice 30 through which air can escape from the conduit system. The effective cross-sectional flow area of the orifice 30 is determined by the axial position of the valve body 32 relative to the valve seat 28.

The pressurized air in the valve seat passageway 31 exerts a force on the valve body 32 equal to the product of the pressure in the passageway 31 and the effective area of the valve body on which that pressure acts. The force acting on the valve body 32 is transmitted to the float 18, so that relative movement takes place between the float 18 and the valve body 32, on the one hand, and the valve seat 28, on the other hand, until the flow area of the orifice 30 is adjusted to provide an air pressure on the valve body 32 just sufficient, with the weight of the valve body and the float, to balance the buoyancy force exerted by the oil on the float. The resulting air pressure is monitored by the gage 48, which is calibrated to indicate the volume of the oil in the reservoir 12.

The force acting on the valve body 32 as a result of the pressure in the passageway 31 adjusts to the necessary balancing value because of the variable relationship between the flow areas of the restriction orifice 37 and the outlet orifice 30. The air pressure in the air conduit system upstream of the restriction orifice 37 remains constant due to the pressure regulator 35. As the flow area of the outlet orifice 30 varies, however, the pressure downstream of the restriction orifice varies correspondingly. Thus, as the flow area of the outlet orifice 30 decreases and the air flow through the conduit system likewise decreases, the air pressure downstream of the restriction orifice 37 approaches the air pressure upstream of the orifice. As the outlet orifice flow area increases and the air flow through the conduit system increases, the pressure drop across the restriction orifice 37 increases and the pressure downstream thereof decreases.

In the indicator system of FIG. 1, when the oil 14 in the reservoir 12 reaches the predetermined maximum or "full" level 16 illustrated, the buoyancy force on the float 18 will just be sufficient to seat the valve body 32 in the orifice 30. Thus, when the oil in the oil pan 12 is at the full level and the control valve 38 is actuated to activate the indicator, no air will escape from the air conduit system, so that the pressure downstream of the restriction orifice 37 and at the gage 48 will equal the pressure established by the pressure regulator 35, and the gage 48 will indicate the volume of oil (in quarts, for example) in the reservoir 12 corresponding to the full level. (Alternatively, the gage 48 could be calibrated to indicate full, and the number of quarts below full.)

When the oil 14 in the oil reservoir 12 is at a level lower than the full level illustrated and the control valve 38 is opened to admit air under pressure, the buoyant force exerted on the float 18 by the oil 14 will be insufficient to maintain the valve body 32 seated in the orifice 30 against the force developed by the air pressure in the passageway 31 together with the weight of the valve body and the float. The float 18 and the valve body 32 will both move slightly downward away from the valve seat 28, thereby permitting pressurized air to escape through the orifice 30 and the lateral bores 61 in the projection 24 and into the oil reservoir 12. The resulting reduced pressure in the air conduit system downstream of the restriction orifice will be indicated by the gage 48 as a less than full amount of oil in the oil reservoir.

Figure 2:
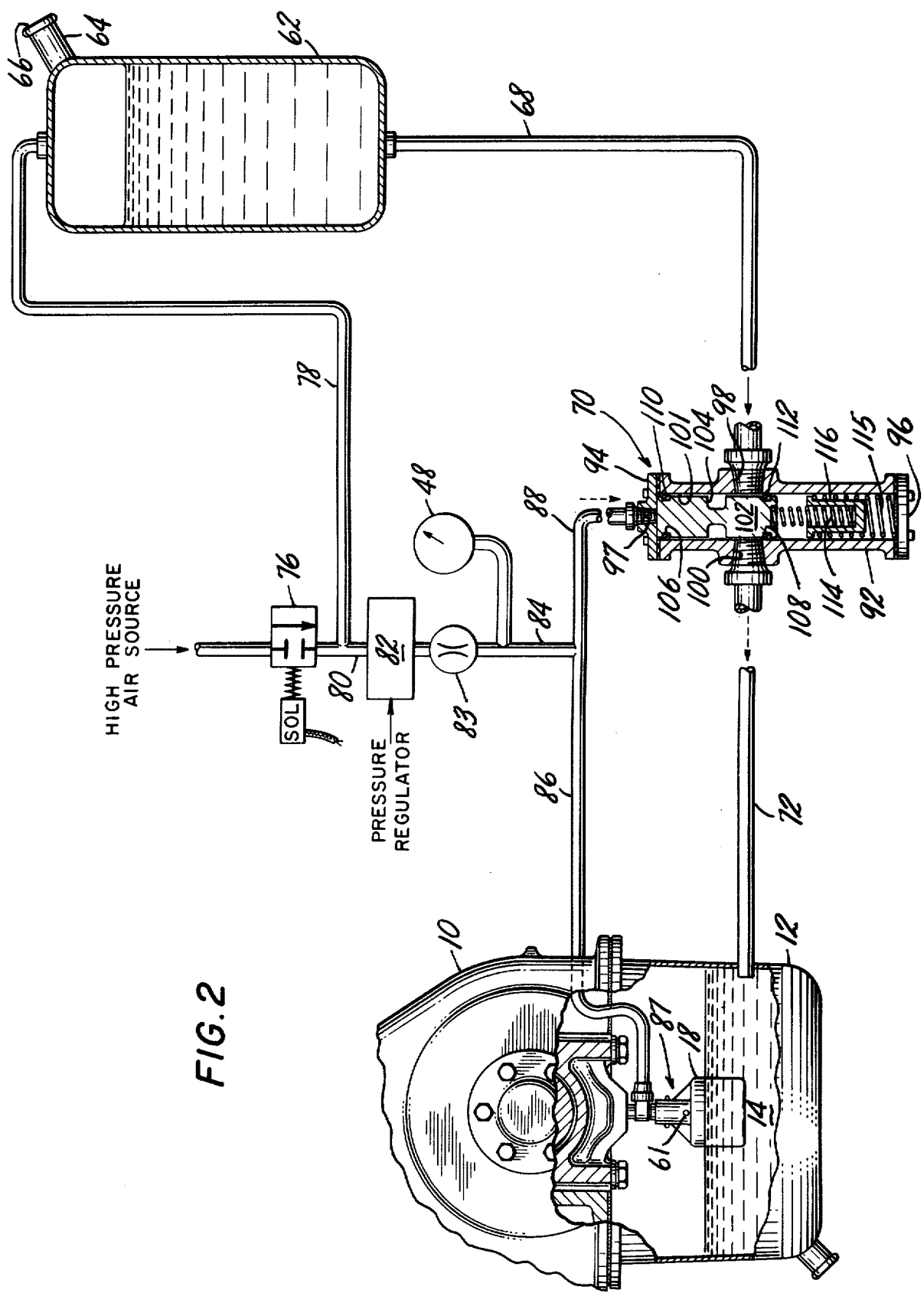
FIG. 2 is a partial sectional view of an automatic oil refill system for the crankcase oil reservoir of a reciprocating piston engine, which system incorporates the liquid level indicator of the present invention.

FIG. 2 illustrates an oil level indicator similar to the indicator of FIG. 1, which is coupled with an automatic refill system for the crankcase oil reservoir 12. The automatic refill system includes an auxiliary oil reservoir 62, which has a spout 64 for adding oil and a cap 66 for hermetically sealing the reservoir. An oil line 68 is connected at one end to the bottom of the auxiliary reservoir 62, and at the other end to a pneumatically operated control valve 70, which controllably couples the oil line 68 with an oil line 72 leading into the lower portion of the crankcase oil reservoir 12.

Pressurized air is delivered to a solenoid valve 76, which controls the air flow to an air conduit 78 connected to the top of the auxiliary oil reservoir 62 and to a conduit 80 connected to a conventional pressure regulator 82. Air from the regulator 82 flows through a restriction orifice 83 and into an air line 84 which branches into a line 86 leading to a liquid level valving mechanism 87, generally similar to the mechanism including the elements 18-32 of FIG. 1, and into a line 88 leading to the pneumatically operated control valve 70. The gage 48 is coupled to the line 84 to monitor the air pressure therein and indicate the volume of oil 14 in the reservoir 12.

The control valve 70 comprises a tubular outer casing 92 closed at its ends by circular plates 94 and 96. The end plate 94 has a central threaded bore 97 which provides an inlet for pressurized air. Opposed threaded bores 98 and 100 are formed in the casing 92 approximately midway along its length for connection with the oil lines 68 and 72, respectively, through which flows the oil to be controlled by the valve 70. Slidably received in an axial bore 101 in the casing 92 is a cylindrical slide member 102, which has a central annular groove 104 and annular grooves 106 and 108 adjacent the ends of the slide. The end grooves 106 and 108 receive O-ring sealing members 110 and 112, respectively, while the central groove 104 affords a passage through the valve 70 when the groove 104 is at least partly in registry with the threaded bores 98 and 100. The slide 102 is positioned against the end plate 94 by a pair of biasing springs 114 and 115 when the solenoid valve 76 is closed. When pressurized air is delivered to the pneumatic control valve 70 through the threaded bore 97, the slide member 102 is pushed away from the end plate 94 against the biasing action of a relatively flexible spring 114 and a relatively stiff spring 115. The spring 114 acts between the slide 102 and a spacer 116, and the spring 115 acts between the spacer 116 and the end plate 96. As the central annular groove 104 moves into registry with the threaded bores 98 and 100, oil is allowed to pass through the valve 70 to the oil reservoir 12.

In the system illustrated in FIG. 2, the pressure in the conduit system downstream of the pressure regulator 82 when the oil 14 in the reservoir 12 is at the full level may be 26 psig., for example. The pneumatic control valve 70 is constructed so that the biasing spring 114 is compressed to the extent that the slide 102 engages the spacer 116 and the valve is fully open, when the pressure in the conduit system is approximately 5 psig. As the air pressure in the system increases, the slide 102 moves beyond its fully open position against the biasing action of the spring 115 so as to reduce the effective flow area through the valve 70. At 26 psig. of air pressure, the valve 70 is again fully closed.

When the solenoid valve 76 is closed, the conduit system downstream thereof is vented to atmosphere through a vent (not shown) in the valve 76, and the springs 114 and 115 drive the slide 102 against the end plate, thereby closing the control valve 70 and preventing any oil seepage from the auxiliary reservoir 62.

The automatic refill system of FIG. 2 is activated by opening the solenoid valve 76 by actuating a switch (not shown) in the vehicle cab. High pressure air flows through the open valve 76 and the pressure regulator 82 to the oil level indicator valve mechanism 87. The level of the oil in the reservoir 12 is represented by the pressure in the conduit system 84, 86 and 88 downstream of the restriction orifice 83, which pressure is displayed as a liquid level or volume on the gage 48. The pressure in the conduit system also operates the pneumatic control valve 70 to regulate the flow of oil into the reservoir 12 and bring the oil level in the reservoir up to the full level, if necessary. Positive flow of oil from the auxiliary reservoir 62 to the primary reservoir 12 is assured by the pressurized air delivered through the line 78 to the top of the auxiliary reservoir 62. In order to refill the auxiliary reservoir 62, the pressure built up in the auxiliary reservoir is relieved through the vent (not shown) in the back of the valve 76 by closing that valve.

FIG. 3 of the drawings illustrates a second embodiment of an automatic refill system generally similar to the system of FIG. 2. In the system of FIG. 3, pressurized air is delivered through a pressure regulator 120 to a threeway switching mechanism 122. When the switching mechanism 122 is at the central "off" position, air does not flow beyond the mechanism. When the mechanism 122 is in the left-hand "check" position, pressurized air flows through a restriction orifice 123 in an air line 124 to a one-way check valve 126. From the check valve 126, the air flows through a line 128 to the oil level indicator valve mechanism 87 similar to the mechanism of FIGS. 1 and 2. The gage 48 coupled to the line 124 indicates the level or volume of the oil 14 in the reservoir 12 in the manner previously described.

When the valve mechanism 122 is in the right-hand "fill" position, pressurized air flows through a line 130 to the top of the auxiliary oil reservoir 62. The air also flows through a branch line 132 to a conventional pneumatically operated control valve 134. The valve 134 is normally closed, but is opened when air under pressure is supplied to the line 132. The pressurized air in the line 132 opens the control valve 134, and the pressurized air in the line 130 forces oil from the auxiliary reservoir 62 through an outlet line 68 leading from the bottom of the reservoir, the opened control valve 134, and the line 128 to the valve mechanism 87. The one-way check valve 126 prevents oil from flowing back into the line 124. As oil flows through the valve mechanism 87 by way of the outlet orifice 30 (see FIG. 1) and the lateral bores 61 into the reservoir 12, the buoyancy force exerted on the float 18 by the oil 14 increases as the oil level moves up the float until the valve body (not shown) is seated in the outlet orifice (not shown) and shuts off the flow of oil.

It will be understood that the above-described embodiments are merely exemplary and that persons skilled in the art may make many variations and modifications without departing from the spirit and scope of the invention. For example, while the illustrated embodiments of the invention utilize pressurized air, any other convenient pressurized fluid may be used in the indicator, such as oil. Thus, pressurized oil could be supplied to the pressure regulator 35 directly from the engine oil gallery or the main bearing oil feed passage. This would permit continuous reading of the oil level in the reservoir 12 by eliminating the control valve 38, because of the continuous application of pressurized oil to the conduit system. In addition, other shapes of valve seats and valve bodies, such as needle valves, may be employed. Also, the tubular fitting 22 could extend well below the full oil level in the reservoir 12 and entirely through the float, the float having an annular shape so as to slide over the fitting 22. In such an embodiment, the valve body would be supported below the float and would preferably include an oil resistant elastomer sealing member. Furthermore, the shape of the float may be made trapezoidal in vertical cross section, for example, to provide a nonlinear response at the gage 48 to oil level changes, if desired. Also, an electrical switch could be coupled to the gage 48 in order to sound an alarm when the oil in the reservoir reached a predetermined low level. Finally, the conduit 78 or 130 could be disconnected from the top of the auxiliary reservoir 62 and the cap 66 vented to the atmosphere, thereby providing a gravity feed from the auxiliary reservoir, if desired. All such modifications and variations are intended to be within the scope of the invention as defined in the appended claims.

I claim:

1. A liquid level indicator for a container adapted to contain a liquid comprising:
   a. a source of fluid under pressure;
   b. a fluid conduit system coupled to and communicating with the fluid source;
   c. means defining a restriction orifice in the conduit system;
   d. fluid pressure responsive gage means coupled to the conduit system downstream of the restriction orifice; and
   e. valve means coupled to the conduit system downstream of the restriction orifice, the valve means including
      i. a valve seat defining an orifice that communicates with the conduit system and is an outlet for fluid in the system;
      ii. a valve body movable toward and away from the valve seat so as to vary the cross-sectional flow area of the orifice, the pressure of the fluid in the conduit system between the restriction orifice and the outlet orifice exerting a force on the valve body in a first direction; and
      iii. a float member operatively coupled to the valve body and being mounted within the container for limited vertical movement, so that a buoyancy force acting upwardly on the float member causes the float member to exert a force on the valve body in a second direction, the second direction being opposite to the first direction;
   so that when liquid in the container is at any level within a predetermined range of levels, the liquid exerts a corresponding buoyancy force on the float member, which in turn exerts the force on the valve body in the second direction, which force is opposed and balanced by the force exerted by the pressurized fluid on the valve body in the first direction, the pressure of the fluid in the conduit system between the restriction orifice and the outlet orifice being indicative of the level of liquid in the container.

2. A liquid level indicator according to claim 1, wherein the entire valve means is adapted to be located within the liquid container.

3. A liquid level indicator according to claim 1, further comprising control means for selectively interrupting a flow of fluid under pressure from the fluid source to the valve means and the gage means.

4. A liquid level indicator according to claim 1, wherein the gage means is remote from the float member.

5. A liquid level indicator according to claim 1, wherein the gage means is calibrated to indicate the liquid level in the container in response to the fluid pressure in the conduit system downstream of the restriction orifice.

6. A liquid level indicator according to claim 1, wherein the liquid container is a crankcase oil reservoir for an internal combustion engine, the liquid is lubricating oil, and the fluid is air.

* * * * *